United States Patent [19]

Wu

[11] Patent Number: 4,798,255

[45] Date of Patent: Jan. 17, 1989

[54] FOUR-WHEELED T-HANDLEBAR INVALID CARRIAGE

[76] Inventor: Donald P. H. Wu, No. 169, Ken Tzu Ku, Shang Ken Tsun, Hsin Feng Hsiang, Hsinchu County, Taiwan

[21] Appl. No.: 113,983

[22] Filed: Oct. 29, 1987

[51] Int. Cl.⁴ ............................................... B62B 9/00
[52] U.S. Cl. .................................. 180/65.1; 280/111; 280/112 R
[58] Field of Search ............................ 180/65.1, 65.6; 280/DIG. 5, 95 R, 95 A, 111, 112 R, 112 A, 772

[56] References Cited

U.S. PATENT DOCUMENTS

| | | | |
|---|---|---|---|
| 2,886,118 | 5/1959 | Strunk | 280/772 |
| 2,994,546 | 8/1961 | Cooper | 280/111 |
| 3,664,450 | 5/1972 | Udden et al. | 280/111 |
| 4,570,739 | 2/1986 | Kramer | 180/65.1 |
| 4,633,962 | 1/1987 | Cox et al. | 180/65.1 |

FOREIGN PATENT DOCUMENTS

87/02633  5/1987  World Int. Prop. O. ......... 180/65.1

*Primary Examiner*—David M. Mitchell
*Assistant Examiner*—Richard Camby
*Attorney, Agent, or Firm*—Sherman and Shalloway

[57] ABSTRACT

The four-wheeled T-handlebar carriage is deliberately designed for the senile and the invalid. The rider can easily operate the carriage with the aid of the T-shaped steering handlebar and drive safely without fear of overbalancing while the provision of four wheels ensures extraordinary stability for the carriage body. A safe and pleasant drive on the carriage is therefore attainable to all the senile and invalid population.

2 Claims, 4 Drawing Sheets

FOUR-WHEELED T-HANDLEBAR INVALID CARRIAGE

BACKGROUND OF THE INVENTION

The present invention relates generally to a carriage for the senile and the invalid and particularly to a carriage which is operated with a T-shaped handlebar and stablized with the device of four wheels.

So far, all other types of carriages for the senile and the invalid have been proposed to be three-wheeled, though with T-shaped steering handlebars as well. Such a three-wheeled carriage, however, often causes difficulty in maintaining balance for an aged or invalid rider, who is constantly endangered, for instance, by the carriage's overturning.

With the foregoing in mind, it is an object of the present invention to provide a convenient and safe four-wheeled T-handlebar invalid carriage which works with extraordinary stability while moving.

SUMMARY OF THE INVENTION

The objects and advantages of the present invention will appear as the description proceeds when taken in connection with the accompanying drawings, in which.

Figure 1:
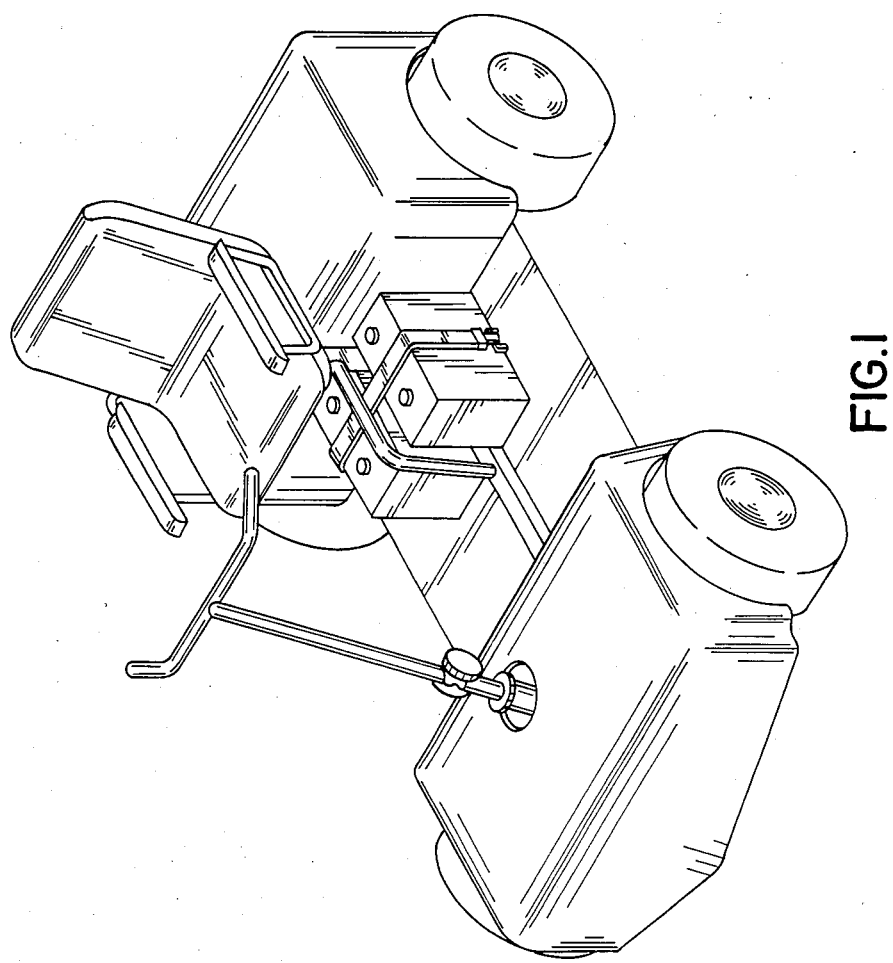
FIG. 1 is a view of the outline of the fourwheeled T-handlebar invalid carriage.
Figure 2:
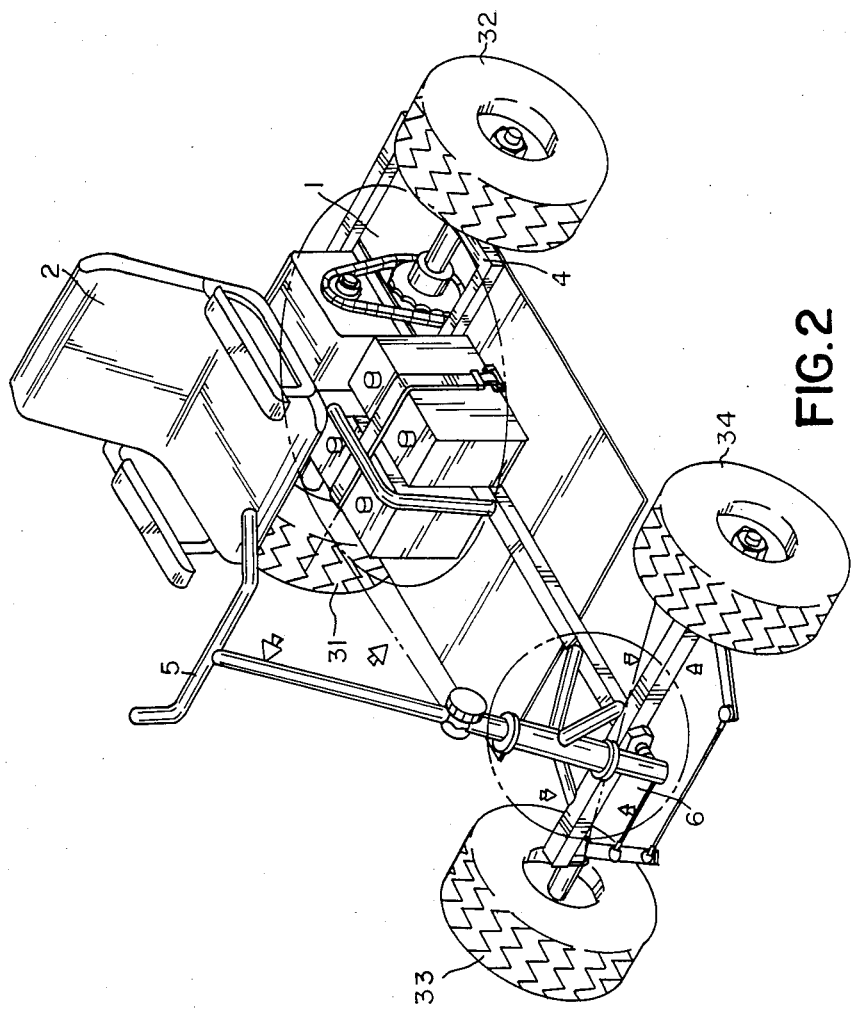
FIG. 2 is a perspective view of the invalid carriage when assembled.
Figure 3:
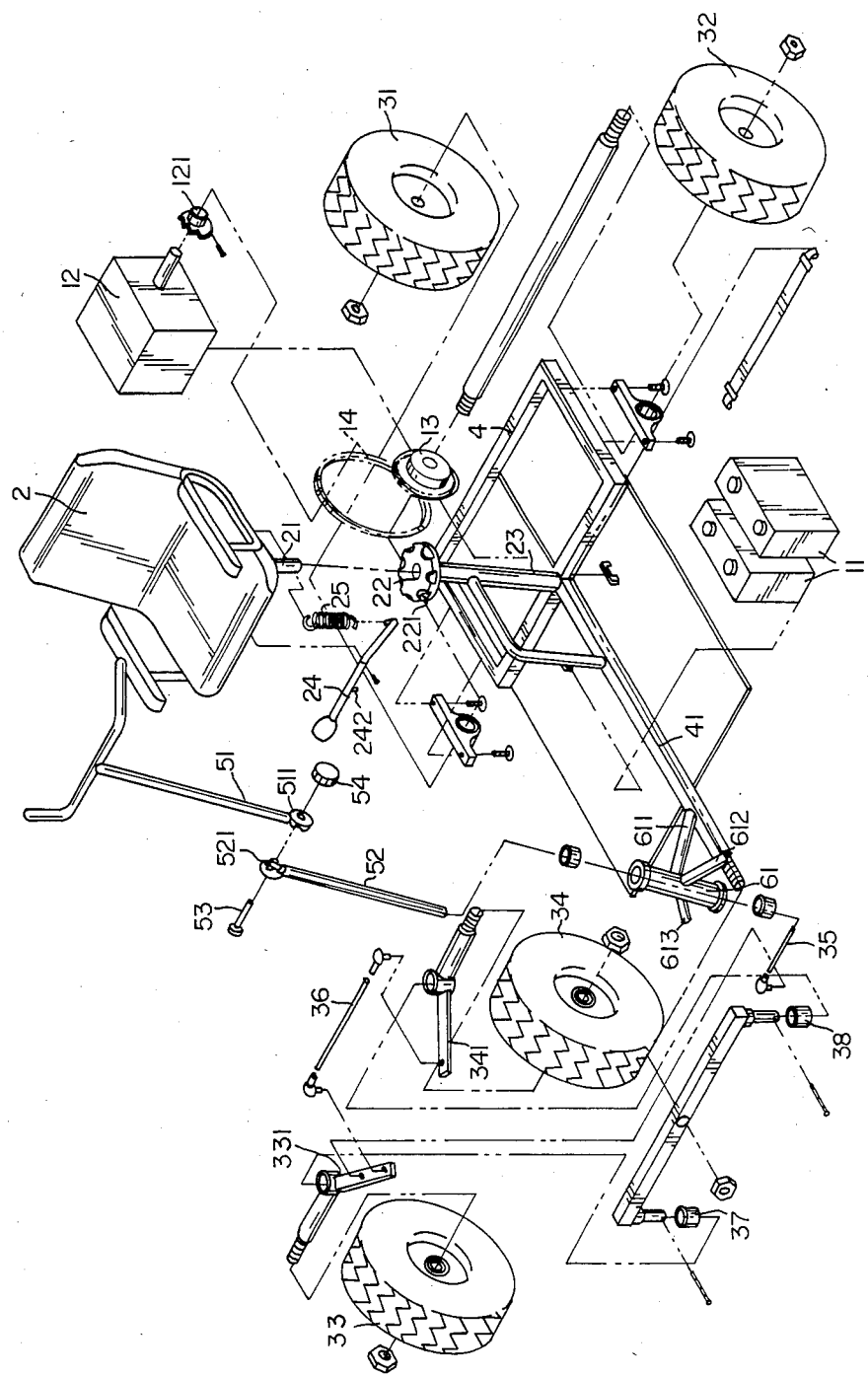
FIG. 3 is a perspective view of the various parts of the invalid carriage when disassembled.
Figure 4B:
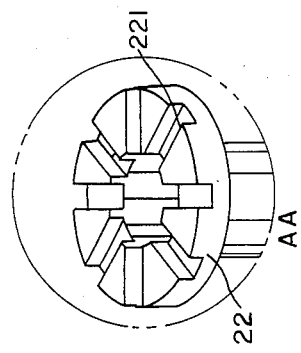
FIG. 4 is a sectional view of the seat of the invalid carriage, illustrating the rotary movements of the seat.
Figure 4A:
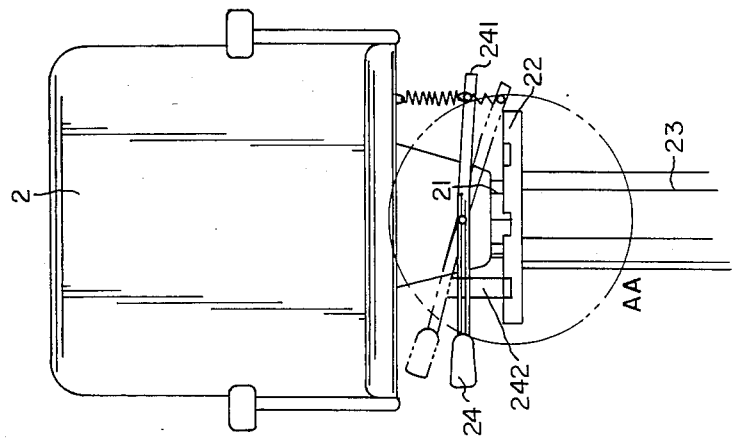

As shown in FIGS. 1-4, the four-wheeled T-handlebar invalid carriage includes a dynamic device 1, installed underneath a seat 2 and above a seat stand 4, comprising a motor 12 powered by means of a battery 11 (i.e. a storage battery). The carriage is driven by rear wheels 31 and 32 when a chain 14 connects a differential 13 installed between the rear wheels to a gear 121 of the motor 12.

A T-shaped handlebar 5 consists of a supporting rod 51 and a slant steering rod 52. The tooth surface 511 at the lower end of the supporting rod and the tooth surface 521 at the upper end of the slant steering rod are interlocked tightly with a screw 53 and a nut 54, so that the two rods, 51 and 52, can be assembled. By loosening the nut 54 and then rotating the tooth surfaces 511 and 521, the rider can adjust the handlebar 5 to a position most suitable for him/her to hold and make the best use of the space as well.

A device 6 is provided to restrict the angle of front-wheel oscillation. The bottom part of the slant steering rod 52 is inserted into a sleeve 61 of the device 6, welded fixedly to a link rod 35, and thereby connected to a plate link 331 which is connected to a front-wheel 33 and is welded to the link rod 35. The T-shaped handlebar 5 is therefore steered to control and adjust the steering angle of front-wheels 33 and 34. The front-wheels 33 and 34 are placed separately at the two ends of a horizontal rod 42 and connected to plate links 331 and 341; a link rod 36 in turn connects the plate links 331 and 341 and controls the steering angle of the front-wheels.

The device, which controls the angle of front-wheel oscillation, is supported by sleeve 61 which is supported by shaft 611 welded fixedly to a horizontal rod 41 of the seat stand 4. Attached to the opposite sides of the sleeve 61 are rods 612 and 613 which are to restrict the tilting of the horizontal rod 42 of the seat stand 4. When one of the front-wheels 33 and 34 at the two ends of the horizontal rod 42 tilts because of the rough road surface, the accordion rod, that is, either rod 612 or 613 which resiliently deforms and begins restricting the tilting movement and prevents the carriage from overbalancing or overturning.

Seat 2 comprises an adjustable rotating device. A main shaft 21 extends from the bottom of the seat 2; the main shaft 21 is inserted through a disc 22 and into a sleeve 23 and is fixed on the seat stand 4. A pulling rod 24 penetrates the rear of the main shaft 21; one end of a spring 25 is fastened to the end 241 of the pulling rod 24, and the other end of the spring 25 is fastened to the bottom of the seat 2. Pulling the rod 24 upward in accordance with grooves 221 circularly patterned on the disc 22, the rider may rotate and adjust the seat 2 to a proper angle, and to fix the seat 2 the rider needs only to release the pulling rod 24 and lock its protuberant block 242 inside a groove 221. Such an adjustable rotating device as the seat 2 makes it a convenient drive for those who have difficulties in getting aboard or alighting from the carriage.

The foregoing description and the drawings are given merely to explain and illustrate the invention and the invention is not to be limited thereto, since those skilled in the art who have the disclosure before them will be able to make modifications and variations therein without departing from the scope of the invention.

That which is claimed is:

1. An invalid carriage comprising:
   a rigid seat support frame for supporting a seat for rotation about a substantially vertical axis;
   a seat, rotatable about a substantially vertical axis, supported on said seat support frame;
   locking means for releasably locking said seat supported on said seat support frame in a predetermined rotational position;
   a laterally extending rotatable rear axle journally supported on said seat support frame for rotation about a substantially horizontal lateral axis, said rotatable rear axle having a first end and a second end;
   a pair of rear wheels, each of said rear wheels fixed to a respective end of said rotatable rear axle for rotation therewith;
   power supply means mounted on said seat support frame for providing motive power for rotation of said rear axle about said substantially horizontal lateral axis;
   transmission means, interconnecting said power supply means and said rotatable rear axle, for rotating said rear axle about said substantially horizontal lateral axis upon provision of motive power from said power supply means;
   a laterally extending rod pivotally mounted on said seat support frame for pivotal movement about a substantially horizontal longitudinal axis, said laterally extending rod having a first end and a second end, said laterally extending rod being spaced longitudinally forwardly of said rear axle;
   a pair of front wheels, each rotatable about a substantially horizontal axis;
   mounting means for fixing said pair of front wheels to respective ends of said laterally extending rod for rotation about said substantially horizontal axis, said mounting means being pivotally connected to said laterally extending rod for pivotal movement about a substantially vertical axis;

steering means, for causing pivotal movement of said mounting means about said substantially vertical axis said steering means including a T-handlebar mounted on said seat supports frame by a sleeve member;

front wheel oscillation restriction means, mounted on said sleeve member, for yieldably resisting pivotal movement of said laterally extending rod about said substantially horizontal longitudinal axis beyond a predetermined extent.

2. The invalid carriage according to claim 1, wherein said power supply means comprises an electric motor and a storage battery electrically connectable to said electric motor.

* * * * *